(12) United States Patent
Wang et al.

(10) Patent No.: US 12,542,295 B2
(45) Date of Patent: Feb. 3, 2026

(54) NEUTRAL ZINC IRON FLOW BATTERY AND USE THEREOF

(71) Applicants: CHINA ENERGY INVESTMENT CORPORATION LIMITED, Beijing (CN); National Institute of Clean-and-Low-Carbon Energy, Beijing (CN)

(72) Inventors: Rui Wang, Beijing (CN); Zhen Yao, Beijing (CN); Qinghua Liu, Beijing (CN)

(73) Assignees: CHINA ENERGY INVESTMENT CORPORATION LIMITED, Beijing (CN); NATIONAL INSTITUTE OF CLEAN-AND-LOW CARBON ENERGY, Beijing (CN)

( * ) Notice: Subject to any disclaimer, the term of this patent is extended or adjusted under 35 U.S.C. 154(b) by 469 days.

(21) Appl. No.: 18/010,711

(22) PCT Filed: Mar. 26, 2021

(86) PCT No.: PCT/CN2021/083214
§ 371 (c)(1),
(2) Date: Dec. 15, 2022

(87) PCT Pub. No.: WO2022/007440
PCT Pub. Date: Jan. 13, 2022

(65) Prior Publication Data
US 2023/0246216 A1    Aug. 3, 2023

(30) Foreign Application Priority Data
Jul. 6, 2020    (CN) .......................... 202010642607.5

(51) Int. Cl.
*H01M 8/18*    (2006.01)
(52) U.S. Cl.
CPC ........ *H01M 8/188* (2013.01); *H01M 2220/10* (2013.01); *H01M 2300/0002* (2013.01)
(58) Field of Classification Search
CPC .................................................. H01M 8/188
See application file for complete search history.

(56) References Cited

U.S. PATENT DOCUMENTS

2015/0162633 A1    6/2015    Trudeau, Jr. et al.
2019/0363387 A1*   11/2019   Selverston .............. H01M 8/08

FOREIGN PATENT DOCUMENTS

| CN | 105474446 A | 4/2016 |
| CN | 108232265 A | 6/2018 |
| CN | 108615921 A | 10/2018 |
| CN | 110770949 A | 2/2020 |

OTHER PUBLICATIONS

Office Action issued Nov. 2, 2022 by the Chinese Patent Office in corresponding Application No. 202010642607.5 (6 pages).
International Search Report issued in International Application No. PCT/CN2021/083214 (3 pages).
Selverston, S., Savinell, R.F., and Wainwright, J.S. (2017). Zinc-iron flow batteries with common electrolyte. Journal of the Electromechanical Society, vol. 164(6), pp. 1-7.

* cited by examiner

*Primary Examiner* — Brian R Ohara
(74) *Attorney, Agent, or Firm* — Lee & Hayes, P.C.

(57) ABSTRACT

The invention relates to the field of flow batteries, and in particular relates to a neutral zinc iron flow battery and the use thereof. The neutral zinc iron flow battery comprises a negative electrode electrolyte solution and a positive electrode electrolyte solution, wherein a negative electrode electrolyte in the negative electrode electrolyte solution comprises a first ferrous salt and a zinc salt, the molar ratio of the first ferrous salt to the zinc salt is 0.01 to 0.25:1, wherein the first ferrous salt is based on $Fe^{2+}$, and the zinc salt is based on $Zn^{2+}$. By doping the first ferrous salt in the negative electrode electrolyte solution and defining the molar ratio of the first ferrous salt to the zinc salt, the concentration of the negative electrode electrolyte active material is increased, the permeation of the positive electrode ferrous ions is reduced, and the stability of the negative electrode electrolyte solution is improved; moreover, the negative electrode electrolyte solution delays the generation of zinc dendrites and improves the energy density and cycle stability of the neutral zinc iron flow battery.

20 Claims, No Drawings

NEUTRAL ZINC IRON FLOW BATTERY AND USE THEREOF

CROSS-REFERENCE TO RELATED APPLICATIONS

This application is a U.S. national stage application under 35 U.S.C. § 371 of PCT International Application No. PCT/CN2021/083214, filed Mar. 26, 2021, and claims the benefit of priority to Chinese patent application No. 202010642607.5, entitled "Neutral Zinc Iron Flow Battery and Use Thereof", filed Jul. 6, 2020, the contents of both of which are hereby incorporated by reference in their entirety.

TECHNICAL FIELD

The present invention relates to the field of flow batteries, and in particular relates to neutral zinc iron flow batteries and use thereof.

BACKGROUND

Flow energy storage battery is a large-scale electrochemical energy storage technology. Compared with other energy storage technologies, flow energy storage battery has the advantages of high energy conversion efficiency, flexible system design, large storage capacity, free site selection, deep discharge, being safe and friendly to the environment, and low maintenance cost.

At present, the relatively mature flow batteries comprise all-vanadium flow battery, zinc bromine flow battery, sodium polysulfide bromine flow battery, etc. However, in use, high concentrations of sulfuric acid are needed when using all-vanadium flow battery, which will cause corrosion to the pipeline, zinc bromine and sodium polysulfide bromine flow battery will precipitate bromine during use, which will pollute the environment and cause corrosion.

In the past, most of the zinc iron flow batteries were alkaline electrolytes. The corrosion of the separator by strong alkalis limited the service life of the batteries. At the same time, the low solubility of ferricyanide in the positive electrode electrolyte solution resulted in low energy density of the batteries.

CN108615921A relates to a neutral zinc iron flow battery. The positive electrode electrolyte in the positive electrode electrolyte solution comprises a ferrous salt, additives and supporting electrolytes, the negative electrode electrolyte in the negative electrode electrolyte solution is neutral zinc salt and a supporting electrolyte, and the battery separator uses porous membrane. The porous membrane between the positive and negative electrodes of the battery prevents the positive and negative active materials from mixing and conducts the supporting electrolyte. Both positive and negative electrode electrolyte solutions are neutral, which overcomes the problem of corrosivity of the strong acid and strong alkali electrolytes of traditional flow batteries. At the same time, the separator uses a porous membrane, which has low cost and good performance.

CN108232265A relates to a neutral zinc iron flow battery. The positive electrode electrolyte in the positive electrode electrolyte solution is a ferrous salt; the negative electrode electrolyte in the negative electrode electrolyte solution is a neutral zinc salt, and the solvent is water. The positive and negative electrode electrolyte solutions are neutral, which overcomes the problem of corrosivity of the strong acid and strong alkali electrolytes of traditional flow batteries. At the same time, the porous membrane between the positive and negative electrodes of the battery prevents the positive and negative active materials from mixing and conducts the supporting electrolyte.

SUMMARY

The object of the present invention is to overcome the problems such as poor stability, low energy efficiency, low energy density and the like present in the existing neutral zinc iron flow battery, and provide a neutral zinc iron flow battery and use thereof. The battery has the advantages such as high stability, high cycle performance etc., and the battery has high safety and simple structure. In order to achieve the above object, in the first aspect, the invention provides a neutral zinc iron flow battery, wherein the neutral zinc iron flow battery comprises a negative electrode electrolyte solution and a positive electrode electrolyte solution, wherein the negative electrode electrolyte in the negative electrode electrolyte solution comprises a first ferrous salt and a zinc salt. The molar ratio of the first ferrous salt to the zinc salt is 0.01-0.25:1, wherein the first ferrous salt is based on $Fe^{2+}$ and the zinc salt is based on $Zn^{2+}$.

Preferably, based on the negative electrode electrolyte solution, the concentration of the first ferrous salt is 0.01-0.5 mol/L.

Preferably, the positive electrode electrolyte in the positive electrode electrolyte solution comprises a second ferrous salt and an optional ferric salt.

Preferably, the molar ratio of the second ferrous salt to the ferric salt is 1-10:0-5, wherein the second ferrous salt is based on $Fe^{2+}$ and the ferric salt is based on $Fe^{3+}$.

The second aspect of the invention provides use of the above neutral zinc iron flow battery in renewable energy generation and storage, emergency power system, reserve power station and power system peak cut.

Compared with the prior art, the present invention has the following advantages:

(1) Compared with the negative electrode electrolyte solution containing zinc salt in the prior art, the present invention dopes a first ferrous salt in the negative electrode electrolyte solution, and increases the concentration of the active material in the negative electrode electrolyte by limiting the molar ratio of the first ferrous salt to the zinc salt, also reduces the penetration between ferrous ions and improves the stability of the negative electrode electrolyte solution; at the same time, the negative electrode electrolyte solution delays the generation of zinc dendrites and improves the energy density and cycle stability performance of the neutral zinc iron flow battery;

(2) The positive electrode electrolyte solution provided by the present invention comprises a second ferrous salt and an optional ferric salt, especially the positive electrode electrolyte solution comprises a second ferrous salt and an ferric salt, which more effectively improves the stability of the ferrous salt in the neutral zinc iron flow battery, increases the battery efficiency, cycle performance and energy density of the neutral zinc iron flow battery, and avoids the corrosivity of the strong acid or strong alkali electrolyte system;

(3) The neutral zinc iron flow battery provided by the invention has the characteristics of non-corrosiveness, high safety, good stability, simple structure, etc., and has abundant zinc and iron reserves, low cost, and is convenient for industrialized large-scale production

EMBODIMENTS

Specific embodiments of the present invention will be described in detail below. It should be understood that the specific embodiments described herein are only used to illustrate and explain the present invention, but not to limit the present invention.

In a first aspect, the present invention provides a neutral zinc iron flow battery, the neutral zinc iron flow battery comprises a negative electrode electrolyte solution and a positive electrode electrolyte solution, and the negative electrode electrolyte in the negative electrode electrolyte solution comprises a first ferrous salt and zinc salt; the molar ratio of the first ferrous salt and the zinc salt is 0.01-0.25:1, wherein the first ferrous salt is calculated based on $Fe^{2+}$, and the zinc salt is calculated based on $Zn^{2+}$.

In the present invention, unless otherwise specified, the neutral zinc iron flow battery comprises a single cell or an electric pile composed of two or more single cells, the single cell comprises a positive electrode, a separator and a negative electrode, a positive electrode electrolyte solution is passed between the positive electrode and the separator, and a negative electrode electrolyte solution is passed between the negative electrode and the separator.

In the present invention, unless otherwise specified, the solvents of the negative electrode electrolyte solution and the positive electrode electrolyte solution are independently water, wherein the water is selected from distilled water and/or deionized water, preferably deionized water.

The inventor of the present invention found in their studies that: doping the first ferrous salt in the negative electrode electrolyte solution, and by limiting the molar ratio of $Fe^{2+}$ to $Zn^{2+}$ between 0.01-0.25, the negative electrode electrolyte solution provided by the present invention has higher negative electrode electrolyte concentration and stability, and the generation of zinc dendrites and the penetration of positive electrode iron ions can be delayed compared with the negative electrode electrolyte solution comprising a single zinc salt.

According to the present invention, the molar ratio of the first ferrous salt and the zinc salt is 0.01-0.25:1, for example 0.01:1, 0.05:1, 0.1:1, 0.15:1, 0.2:1, 0.25:1, and the intermediate value between any two of them, preferably 0.02-0.1:1, wherein the first ferrous salt is calculated based on $Fe^{2+}$, and the zinc salt is calculated based on $Zn^{2+}$. Using the preferred conditions is more conducive to improving the concentration and stability of the negative electrode electrolyte, and effectively delaying the generation of zinc dendrites and the penetration of positive electrode iron ions.

Further preferably, based on the negative electrode electrolyte solution, the concentration of the first ferrous salt is 0.01-0.5 mol/L, for example 0.01 mol/L, 0.05 mol/L, 0.1 mol/L, 0.15 mol/L, 0.2 mol/L, 0.25 mol/L, 0.25 mol/L, 0.3 mol/L, 0.4 mol/L, 0.5 mol/L, and any intermediate values between the two of them, preferably 0.05-0.3 mol/L.

In the present invention, there's a wide range to select the type of the first ferrous salt, as long as the first ferrous salt contains ferrous ions. Preferably, the first ferrous salt is selected from at least one of ferrous sulfate, ferrous chloride and ferrous bromide, preferably selected from ferrous sulfate and/or ferrous chloride.

In the present invention, there is a wide range to select the type of the zinc salt, in order to further improve the corrosion resistance of the neutral zinc iron flow battery, i.e., the zinc salt is a neutral zinc salt; preferably, the zinc salt is selected from at least one of zinc chloride, zinc sulfate and zinc bromide, preferably selected from zinc chloride and/or zinc sulfate.

According to the present invention, preferably, the negative electrode electrolyte further comprises a first supporting electrolyte and/or a first additive; further preferably, based on the negative electrode electrolyte, the concentration of the first supporting electrolyte is 0.5-10 mol/L, preferably 1-5 mol/L; the concentration of the first additive is 0.01-5 mol/L, preferably 0.1-3 mol/L. By using the preferred conditions, the concentration of the negative electrode electrolyte in the negative electrode electrolyte solution is increased, and the generation of zinc dendrites and the penetration of the positive electrode iron ions are delayed.

In some embodiments of the present invention, preferably, the negative electrode electrolyte comprises a first ferrous salt, a zinc salt, a first supporting electrolyte and a first additive, and the molar ratio of $Fe^{2+}$ to $Zn^{2+}$ is 0.01-0.25. Using the preferred negative electrode electrolyte is more conducive to the improvement of the energy efficiency and energy density of the battery.

In the present invention, there is a wide range to select the type of the first supporting electrolyte. Preferably, the first supporting electrolyte is selected from at least one of potassium chloride, potassium sulfate, potassium nitrate, ammonium chloride and ammonium sulfate.

In the present invention, there is a wide range to select the type of the first additive. Preferably, the first additive is selected from at least one of sodium citrate, glycine, lysine, sucrose, gelatin, ascorbic acid and DMSO (dimethyl sulfoxide).

According to the present invention, preferably, the positive electrode electrolyte in the positive electrode electrolyte solution contains a second ferrous salt and an optional ferric salt, for example: the positive electrode electrolyte in the positive electrode electrolyte solution contains a second ferrous salt, or the positive electrode electrolyte in the positive electrode electrolyte solution contains a second ferrous salt and an ferric salt, and preferably, the positive electrode electrolyte in the positive electrode electrolyte solution contains a second ferrous salt and an ferric salt. When the positive electrode electrolyte solution contains a second ferrous salt and a ferric salt, the stability of the ferrous salt is improved, thereby the battery efficiency, cycle performance and energy density of the neutral zinc iron flow battery are increased, thus the corrosivity of strong acid or strong alkaline electrolyte systems are avoided.

According to the present invention, preferably, the molar ratio of the second ferrous salt to the ferric salt is 1-10:0-5, for example, the molar ratio can be 1:0, 2:1, 3:1, 4:2, 5:2, 6:3, 7:3, 8:4, 9:4, 10:5, and any intermediate values between the two of them, preferably 3-10:1-5, wherein the second ferrous salt is based on $Fe^{2+}$, and the ferric salt is based on $Fe^{3+}$. Using the optimal conditions is more conducive to improving the stability of ferrous salts in the positive electrode electrolyte solution, thereby improving the battery efficiency, cycle performance and energy density of neutral zinc iron flow batteries, and avoiding the strong corrosivity of strong acid or strong alkali electrolyte systems.

Further preferably, based on the positive electrode electrolyte solution, the concentration of the second ferrous salt is 0.1-3 mol/L, for example 0.1 mol/L, 0.3 mol/L, 0.5 mol/L, 0.7 mol/L, 1 mol/L, 1.25 mol/L, 1.5 mol/L, 1.75 mol/L, 2 mol/L, and any intermediate values between the two of them, preferably 0.5-2 mol/L.

In the present invention, there's a wide range to select the type of the second ferrous salt, as long as the second ferrous salt contains ferrous ions. Preferably, the second ferrous salt is selected from at least one of ferrous sulfate, ferrous chloride and ferrous bromide, preferably selected from ferrous sulfate and/or ferrous chloride.

In the present invention, unless otherwise specified, the first ferrous salt and the second ferrous salt are the same or different.

According to the present invention, preferably, the ferric salt is selected from at least one of ferric sulfate, ferric chloride and ferric nitrate. The ferric salt described in the examples is ferric chloride, but the present invention is not limited to this salt.

According to the present invention, preferably, the positive electrode electrolyte further comprises a second additive and/or a second supporting electrolyte; further preferably, based on the positive electrode electrolyte solution, the concentration of the second supporting electrolyte is 0.5-10 mol/L, preferably 0.5-3 mol/L; the concentration of the second additive is 0.1-5 mol/L, preferably 0.1-3 mol/L.

In some embodiments of the present invention, preferably, the positive electrode electrolyte comprises a second ferrous salt, a ferric salt, a second supporting electrolyte and a second additive. Using the preferred positive electrode electrolyte is beneficial to the stability of the ferrous salt in the positive electrode electrolyte solution and improves the performance of the neutral zinc iron flow battery.

In the present invention, there is a wide range to select the type of the second supporting electrolyte. Preferably, the second supporting electrolyte is selected from at least one of potassium chloride, potassium sulfate, potassium nitrate, ammonium chloride, ammonium sulfate, sodium chloride and sodium sulfate. Unless otherwise specified, the first supporting electrolyte and the second supporting electrolyte are the same or different.

In the present invention, there is a wide range to select the type of the second additive. Preferably, the second additive is selected from at least one of sodium citrate, glycine, lysine, sucrose, gelatin, ascorbic acid and DMSO. Unless otherwise specified, the first additive and the second additive are the same or different.

According to the present invention, preferably, the neutral iron zinc flow battery further comprises a pretreated electrode and a pretreated separator. Using the pretreated electrode and the pretreated separator can further improve the battery efficiency, cycle performance and energy density of the neutral zinc iron flow battery.

In the present invention, there is a wide range to select the types of the electrodes. Preferably, the electrode is selected from at least one of carbon felt, carbon paper, carbon cloth, graphite plate and metal plate.

In the present invention, there is a wide range to select the type of the separator, as long as the positive electrode electrolyte solution and the negative electrode electrolyte solution are separated. Preferably, the separator is a porous membrane, and the material of the porous membrane is selected from polyolefins and/or polyaromatic hydrocarbons. For example, the separator can be a Nafion membrane or a Daramic porous membrane purchased from DuPont, but the present invention is not limited to the two membranes.

In some embodiments of the present invention, preferably, the thickness of the porous membrane is 50-225 µm, preferably 50-125 µm; the water absorption rate of the porous membrane is 5-50%, preferably 30-50%; the pore size of the porous membrane is 0.1-10 nm, preferably 0.3-0.8 nm. Using the optimal conditions can reduce the mutual penetration of positive and negative ions and is more conducive to improving the coulombic efficiency and energy efficiency of the battery.

In some embodiments of the present invention, preferably, the pretreatment of the electrode comprises: first soaking the electrode in an acid solution, and then calcining, wherein the calcining is carried out in air or in a gas mixture containing $NH_3$ and/or $PH_3$ and inert gas. The conditions for calcination comprise: the temperature is 350° C.-600° C., preferably 400° C.-550° C.; the time is 1 hour-15 hours, preferably 2 hours-10 hours.

According to a preferred embodiment of the present invention, the electrode is first soaked in 0.5 mol/L-5 mol/L hydrochloric acid solution overnight, then washed with deionized water, soaked with low alkyl alcohol for 1 hour-5 hours, and then washed with deionized water until the electrode is neutral. Then, the electrode is calcined at 350° C.-600° C. for 1 hour-15 hours in air or a gas mixture of $NH_3$ and/or $PH_3$ and inert gas.

Further preferably, the pretreatment of the separator comprises: soaking the separator in acid solution and the positive electrode electrolyte solution sequentially, and then washing with deionized water.

In a preferred embodiment of the present invention, the separator is first soaked in an acid solution overnight, then cleaned and then soaked in the positive electrode electrolyte solution overnight, and then washed with deionized water to obtain a pretreated separator, Wherein, the acid solution is selected from at least one of sulfuric acid solution, hydrochloric acid solution and nitric acid solution, preferably sulfuric acid solution.

According to the present invention, preferably, the method for preparing the neutral zinc iron flow battery comprises the following steps:

(1) preparation of negative electrode electrolyte solution: mixing the first ferrous salt, zinc salt, optional first supporting electrolyte and/or first additive with deionized water to obtain negative electrode electrolyte solution;

(2) preparation of positive electrode electrolyte solution: mixing the second ferrous salt, the optional ferric salt, the optional second additive and/or the second supporting electrolyte with deionized water to obtain the positive electrode electrolyte;

(3) pretreatment of electrode and separator: soaking the electrode in acid overnight, then washing with deionized water, then soaking in methanol solution, then washing with deionized water until the electrode is neutral, and finally calcining in air, or a gas mixture containing $NH_3$ and/or $PH_3$ and inert gas to obtain a pretreated electrode;

soaking the separator in the sulfuric acid solution overnight, then washing the separator, soaking the separator in the positive electrode electrolyte solution overnight for treatment, and then washing the separator to obtain a pretreated separator;

(4) assembly of a single cell: the structure of a single cell comprises pretreated electrodes, a pretreated separator, gaskets, current collectors, positive and negative electrode end plates, bipolar plates, positive and negative electrode storage tanks, pumps and pipelines, the flow rates of the positive electrode electrolyte solution and the negative electrode electrolyte solution are each independently 10 mL/min-100 mL/min, and the electrode area is 1 $cm^2$-25 $cm^2$.

In a second aspect, the present invention provides use of the neutral zinc iron flow battery in renewable energy generation and storage, emergency power system, reserve power station and power system peak cut.

The present invention will be described below through specific embodiments.

In the examples and comparative examples, the electrodes of the positive and negative electrodes are carbon felt with an electrode area of 4 cm², the bipolar plate is graphite plate, and the separator is Nafion membrane produced by DuPont Company.

The components of the negative and positive electrode electrolytes in examples 1-9 and comparative examples 1-3 are all listed in Table 1.

EXAMPLE 1

(1) Preparation of negative electrode electrolyte solution: 6.82 g $ZnCl_2$ and 0.695 g $FeSO_4 \cdot 7H_2O$ were weighed and dissolved in 100 mL deionized water, the mixture was stirred well, and then 10.75 g $NH_4Cl$ and 0.1 mol/L sodium citrate were added, negative electrode electrolyte solution A1 was obtained.
(2) Preparation of positive electrode electrolyte solution: 13.9 g $FeCl_2$ and 8.1 g $FeCl_3 \cdot 3H_2O$ were weighed and dissolved in 100 mL deionized water, negative electrode electrolyte solution B1 was obtained.
(3) Pretreatment of electrode and separator: the electrode was first soaked in 0.5 mol/L hydrochloric acid overnight, and then washed with deionized water, soaked with methanol, then washed with deionized water until the electrode was neutral, finally, the electrode was calcined at 450° C. in air for 6 hours, the pretreated electrode was obtained.

The Nafion membrane was first soaked in sulfuric acid solution for an overnight treatment, and then washed and soaked in positive electrode electrolyte solution B1 for an overnight treatment, followed by washed with deionized water, the pretreat separator was obtained.

(4) Assembly of a single cell: the pretreated electrode, pretreated Nafion membrane, gaskets, current collector, positive and negative electrodes, bipolar plates end plates, positive and negative electrode storage tanks, pumps and pipelines were assembled, neutral zinc iron flow battery S1 was obtained.

EXAMPLES 2-9

Neutral zinc iron flow batteries S2-S9 were obtained according to the method of example 1, the difference was that the components of the negative and positive electrode electrolytes are different.

COMPARATIVE EXAMPLE 1

Neutral zinc iron flow battery D1 was obtained according to the method of example 1, the difference was that 0.695 g $FeSO_4 \cdot 7H_2O$ was not added.

COMPARATIVE EXAMPLE 2

Neutral zinc iron flow battery D2 was obtained according to the method of example 1, the difference was that 0.695 g $FeSO_4 \cdot 7H_2O$ was not added and the components of the negative and positive electrode electrolyte solutions were different.

COMPARATIVE EXAMPLE 3

Neutral zinc iron flow battery D3 was obtained according to the method of example 1, the difference was that the molar ratio of $Fe^{2+}$ to $Zn^{2+}$ in the negative electrode electrolyte solution was 0.4:1.

TABLE 1

| Number | Active material (mol/L) | Molar ratio* | First supporting electrolyte (mol/L) | First additive (mol/L) |
| --- | --- | --- | --- | --- |
| Example 1 | $ZnCl_2$, 0.5<br>$FeSO_4$, 0.025 | 0.05:1 | $NH_4Cl$, 2 | sodium citrate, 0.1 |
| Example 2 | $ZnCl_2$, 0.5<br>$FeSO_4$, 0.025 | 0.05:1 | $NH_4Cl$, 2 | — |
| Example 3 | $ZnCl_2$, 0.5<br>$FeSO_4$, 0.05 | 0.1:1 | $NH_4Cl$, 2 | ascorbic acid, 0.01 |
| Example 4 | $ZnCl_2$, 0.5<br>$FeSO_4$, 0.125 | 0.25:1 | $NH_4Cl$, 2 | ascorbic acid, 0.01 |
| Example 5 | $ZnCl_2$, 0.5<br>$FeSO_4$, 0.025 | 0.05:1 | $NH_4Cl$, 2 | sodium citrate, 0.1<br>ascorbic acid, 0.01<br>glycine, 2 |
| Example 6 | $ZnCl_2$, 0.5<br>$FeSO_4$, 0.025 | 0.05:1 | $NH_4Cl$, 2 | sodium citrate, 0.1<br>sucrose, 0.01<br>glycine, 2 |
| Example 7 | $ZnCl_2$, 1<br>$FeSO_4$, 0.05 | 0.05:1 | $NH_4Cl$, 2 | — |
| Example 8 | $ZnCl_2$, 1<br>$FeSO_4$, 0.05 | 0.05:1 | $NH_4Cl$, 2 | sodium citrate, 0.1 |
| Example 9 | $ZnCl_2$, 1<br>$FeSO_4$, 0.05 | 0.05:1 | $NH_4Cl$, 2 | sodium citrate, 0.1 |
| Comparative Example 1 | $ZnCl_2$, 0.5 | — | $NH_4Cl$, 2 | — |
| Comparative Example 2 | $ZnCl_2$, 0.5 | — | $NH_4Cl$, 2 | sodium citrate, 0.1 |
| Comparative Example 3 | $ZnCl_2$, 0.5<br>$FeSO_4$, 0.2 | 0.4:1 | $NH_4Cl$, 2 | sodium citrate, 0.1 |

P.S.: the molar ratio* refers to the molar ratio of $Fe^{2+}$ to $Zn^{2+}$ in the negative electrode electrolyte solution, the molar ratio** refers to the molar ratio of $Fe^{2+}$ to $Fe^{3+}$ in the positive electrode electrolyte solution.

TABLE 1-continued

| Number | Positive electrode electrolyte | | | |
|---|---|---|---|---|
| | Active material (mol/L) | Molar ratio** | Second supporting electrolyte (mol/L) | Second additive (mol/L) |
| Example 1 | $FeCl_2$, 0.7<br>$FeCl_3$, 0.3 | 7:3 | $NH_4Cl$, 2 | — |
| Example 2 | $FeCl_2$, 0.7<br>$FeCl_3$, 0.3 | 7:3 | $NH_4Cl$, 2 | — |
| Example 3 | $FeCl_2$, 0.8<br>$FeCl_3$, 0.2 | 8:2 | $NH_4Cl$, 2 | — |
| Example 4 | $FeCl_2$, 0.7<br>$FeCl_3$, 0.3 | 7:3 | $NH_4Cl$, 2 | — |
| Example 5 | $FeCl_2$, 1 | — | $NH_4Cl$, 2 | glycine, 2 |
| Example 6 | $FeCl_2$, 0.7<br>$FeCl_3$, 0.3 | 7:3 | $NH_4Cl$, 2 | glycine, 2 |
| Example 7 | $FeCl_2$, 0.7<br>$FeCl_3$, 0.3 | 7:3 | $NH_4Cl$, 2 | — |
| Example 8 | $FeCl_2$, 0.7<br>$FeCl_3$, 0.3 | 7:3 | $NH_4Cl$, 2 | glycine, 2 |
| Example 9 | $FeCl_2$, 0.5<br>$FeCl_3$, 0.5 | 5:5 | $NH_4Cl$, 2 | glycine, 2 |
| Comparative Example 1 | $FeCl_2$, 0.7<br>$FeCl_3$, 0.3 | 7:3 | $NH_4Cl$, 2 | — |
| Comparative Example 2 | $FeCl_2$, 0.7<br>$FeCl_3$, 0.3 | 7:3 | $NH_4Cl$, 2 | glycine, 2 |
| Comparative Example 3 | $FeCl_2$, 0.7<br>$FeCl_3$, 0.3 | 7:3 | $NH_4Cl$, 2 | — |

P.S.: the molar ratio refers to the molar ratio of $Fe^{2+}$ to $Zn^{2+}$ in the negative electrode electrolyte solution, the molar ratio refers to the molar ratio of $Fe^{2+}$ to $Fe^{3+}$ in the positive electrode electrolyte solution.

Test Example

Battery performance tests were carried out for the neutral zinc iron flow batteries prepared in the examples 1-9 and comparative examples 1-3 (S1-S9 and D1-D3).

Test method: the assembled single cell data was collected by Shenzhen New well charge and discharge tester, and the constant current charge and constant current discharge mode was adopted.

Test conditions: the flow rate of the positive and negative electrode electrolyte solution was 70 mL/min, the charging current was 40 mA/cm², the charging cut-off voltage was 1.8 V, the discharging current was 40 mA/cm², the discharging cut-off voltage was 0.1 V, and the charging capacity was 20 Ah/L. The test results are all listed in Table 2.

TABLE 2

| Number | Neutral zinc iron flow battery | Coulombic efficiency (%) | Energy efficiency (%) | Voltage efficiency (%) | Energy density (Wh/L) |
|---|---|---|---|---|---|
| Example 1 | S1 | 88.5 | 76 | 85.9 | 41 |
| Example 2 | S2 | 90.4 | 78.7 | 87.1 | 41 |
| Example 3 | S3 | 88.1 | 75.2 | 80.6 | 44 |
| Example 4 | S4 | 87.5 | 73.4 | 82.8 | 48 |
| Example 5 | S5 | 92.6 | 81.5 | 88 | 44 |
| Example 6 | S6 | 93.6 | 82.5 | 89.4 | 44 |
| Example 7 | S7 | 94.5 | 83.5 | 88.4 | 79 |
| Example 8 | S8 | 95.2 | 84.1 | 88.3 | 79 |
| Example 9 | S9 | 95.6 | 85 | 88.9 | 79 |
| Comparative Example 1 | D1 | 88.1 | 68.4 | 77.6 | 34 |
| Comparative Example 2 | D2 | 88.6 | 68.5 | 77.3 | 34 |
| Comparative Example 3 | D3 | 85.6 | 68.4 | 79.9 | 34 |

It can be seen from the data in Table 2 that, compared with Comparative Examples 1-3, the neutral zinc iron flow batteries provided by the present invention have excellent battery performance, i.e., they have higher Coulombic efficiency, energy efficiency, voltage efficiency and energy density, especially by limiting the molar ratio of $Fe^{2+}$ to $Zn^{2+}$ in the negative electrode electrolyte solution within the preferred range can significantly improve the battery performance of the battery.

The preferred embodiments of the present invention have been described above in detail, however, the present invention is not limited thereto. Within the scope of the technical concept of the present invention, a variety of simple modifications can be made to the technical solutions of the present invention. In order to avoid unnecessary repetition, the present invention will not describe the various possible combinations. However, these simple modifications and combinations should also be regarded as the contents disclosed in the present invention, and all belong to the scope of protection of the present invention.

The invention claimed is:

1. A neutral zinc iron flow battery,
wherein the neutral zinc iron flow battery comprises a negative electrode electrolyte solution and a positive electrode electrolyte solution;
wherein a negative electrode electrolyte in the negative electrode electrolyte solution comprises a first ferrous salt and zinc salt, the molar ratio of the first ferrous salt to the zinc salt is 0.02-0.1:1, wherein the first ferrous salt is based on $Fe^{2+}$ and the zinc salt is based on $Zn^{2+}$; and
wherein based on the negative electrode electrolyte solution, the concentration of the first ferrous salt is 0.01-0.5 mol/L.

2. The neutral zinc iron flow battery according to claim 1, wherein based on the negative electrode electrolyte solution, the concentration of the first ferrous salt is 0.05-0.3 mol/L.

3. The neutral zinc iron flow battery according to claim 1, wherein the first ferrous salt is at least one of ferrous sulfate, ferrous chloride and ferrous bromide; or wherein the first ferrous salt is at least one of ferrous sulfate and ferrous chloride.

4. The neutral zinc iron flow battery according to claim 1, wherein the negative electrode electrolyte also comprises a first supporting electrolyte and/or a first additive; and wherein based on the negative electrode electrolyte solution, the concentration of the first supporting electrolyte is 1-5 mol/L.

5. The neutral zinc iron flow battery according to claim 4, wherein the first supporting electrolyte is at least one of potassium chloride, potassium sulfate, potassium nitrate, ammonium chloride, ammonium sulfate, sodium chloride and sodium sulfate.

6. The neutral zinc iron flow battery according to claim 1, wherein the positive electrode electrolyte in the positive electrode electrolyte solution comprises a second ferrous salt or a second ferrous salt and a ferric salt.

7. The neutral zinc iron flow battery according to claim 6, wherein the second ferrous salt at least one of ferrous sulfate, ferrous chloride and ferrous bromide or wherein the second ferrous salt is at least one of ferrous sulfate and ferrous chloride.

8. The neutral zinc iron flow battery according to claim 6, wherein the positive electrode electrolyte also comprises a second supporting electrolyte and/or a second additive;
wherein based on the positive electrode electrolyte solution, the concentration of the second supporting electrolyte is 0.5-3 mol/L; and
wherein based on the positive electrode electrolyte solution, the concentration of the second additive is 0.1-3 mol/L.

9. The neutral zinc iron flow battery according to claim 1, wherein the neutral zinc iron flow battery also comprises a pretreated electrode and a pretreated separator; and
wherein the pretreatment of the electrode comprises: soaking the electrode in an acid solution and then carrying out calcination, wherein the calcination is carried out in air or the gas mixture containing $NH_3$ and/or $PH_3$ and inert gas; or
wherein the pretreatment of the separator comprises: soaking the separator in an acid solution and the positive electrode electrolyte solution sequentially, and then washing the separator with deionized water.

10. A method of using the neutral zinc iron flow battery according to claim 1 in renewable energy generation and storage, emergency power system, reserve power station and power system peak cut.

11. The neutral zinc iron flow battery according to claim 7,
wherein the positive electrode electrolyte also comprises a second supporting electrolyte and/or a second additive;
wherein based on the positive electrode electrolyte solution, the concentration of the second supporting electrolyte is 0.5-3 mol/L; and
wherein based on the positive electrode electrolyte solution, the concentration of the second additive is 0.1-3 mol/L.

12. The neutral zinc iron flow battery according to claim 3,
wherein the zinc salt is at least one of zinc chloride, zinc sulfate and zinc bromide; or
wherein the zinc salt is at least one of zinc chloride or zinc sulfate.

13. The neutral zinc iron flow battery according to claim 4,
wherein based on the negative electrode electrolyte solution, the concentration of the first additive is 0.1-3 mol/L.

14. The neutral zinc iron flow battery according to claim 5,
wherein the first additive is at least one of sodium citrate, glycine, lysine, sucrose, gelatin, ascorbic acid and dimethyl sulfoxide (DMSO).

15. The neutral zinc iron flow battery according to claim 6,
wherein the molar ratio of the second ferrous salt to the ferric salt is 1-10:0-5; and
wherein the second ferrous salt is based on $Fe^{2+}$ and the ferric salt is based on $Fe^{3+}$.

16. The neutral zinc iron flow battery according to claim 15,
wherein the molar ratio of the second ferrous salt to the ferric salt is 3-10:1-5; and
wherein the second ferrous salt is based on $Fe^{2+}$ and the ferric salt is based on $Fe^{3+}$.

17. The neutral zinc iron flow battery according to claim 6,
wherein based on the positive electrode electrolyte solution, the concentration of the second ferrous salt is 0.5-2 mol/L.

18. The neutral zinc iron flow battery according to claim 7,
wherein the ferric salt is at least one of ferric sulfate, ferric chloride and ferric nitrate.

19. The neutral zinc iron flow battery according to claim 8,
wherein the second supporting electrolyte is at least one of potassium chloride, potassium sulfate, potassium nitrate, ammonium chloride, ammonium sulfate, sodium chloride and sodium sulfate; and
wherein the second additive is at least one of sodium citrate, glycine, lysine, sucrose, gelatin, ascorbic acid and DMSO.

20. The neutral zinc iron flow battery according to claim 11,
wherein the second supporting electrolyte is at least one of potassium chloride, potassium sulfate, potassium nitrate, ammonium chloride, ammonium sulfate, sodium chloride and sodium sulfate; and
wherein the second additive is at least one of sodium citrate, glycine, lysine, sucrose, gelatin, ascorbic acid and DMSO.

* * * * *